US012801579B2

(12) United States Patent
Liu

(10) Patent No.: US 12,801,579 B2
(45) Date of Patent: Nov. 17, 2026

(54) HIERARCHICAL DATA MODELLING FOR KEY-VALUE IN-MEMORY DATABASES

(71) Applicant: Hewlett Packard Enterprise Development LP, Spring, TX (US)

(72) Inventor: Yanmin Liu, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 20 days.

(21) Appl. No.: 19/037,867

(22) Filed: Jan. 27, 2025

(65) Prior Publication Data

US 2026/0220097 A1 Jul. 30, 2026

(51) Int. Cl.

*G06F 16/00* (2019.01)
*G06F 16/21* (2019.01)
*G06F 16/28* (2019.01)

(52) U.S. Cl.

CPC .......... *G06F 16/212* (2019.01); *G06F 16/282* (2019.01)

(58) Field of Classification Search

CPC ............................... G06F 16/212; G06F 16/21
See application file for complete search history.

(56) References Cited

U.S. PATENT DOCUMENTS

2023/0317163 A1* 10/2023 Le ........................... G11C 11/54 365/148
2023/0350810 A1* 11/2023 Thoppil .............. G06F 12/1018
2024/0143613 A1* 5/2024 Feng ....................... H04L 67/02

OTHER PUBLICATIONS

Github, "RedisJSON/RedisJSON", available online at <https://github.com/RedisJSON/RedisJSON>, 2025, 4 pages.
Github, "sewenew / redis-protobuf", available online at <https://github.com/sewenew/redis-protobuf>, 16 pages.

* cited by examiner

*Primary Examiner* — Cheryl Lewis
(74) *Attorney, Agent, or Firm* — Fletcher Yoder, P.C.

(57) ABSTRACT

A network component may include a memory and a processor. The processor may be configured to execute an in-memory data storage service configured to store data associated with the network component in key-value pairs within the memory, access a hierarchical schema mapping a hierarchical data structure to the key-value pairs within the memory, receive a command having a reference to the hierarchical data structure, identify an associated key-value pair associated with the reference to the hierarchical data structure, and implement the command by performing at least one of: an access action or a modifying action.

19 Claims, 6 Drawing Sheets

HIERARCHICAL DATA MODELLING FOR KEY-VALUE IN-MEMORY DATABASES

BACKGROUND

The present disclosure relates generally to data management systems for in-memory databases. More specifically, the present disclosure relates to a hierarchical data model and selective persistence for key-value in-memory databases.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In-memory databases may be used to store and access data with response times that are relatively faster than other available databases (e.g., databases stored on disks). Certain in-memory databases may further increase data accessibility by employing a key-value model where each value stored in the memory may be accessed by a certain key. Moreover, due to the use of the memory to store such data/information, an in-memory database may support persistence methods to maintain the integrity of the data (e.g., via snapshotting and/or journaling) at regular intervals.

BRIEF DESCRIPTION OF THE DRAWINGS

Features, aspects, and advantages of the present disclosure will become better understood when the following detailed description is read with reference to the accompanying drawings in which like characters represent like parts throughout the drawings, wherein.

DETAILED DESCRIPTION

Figure 1:
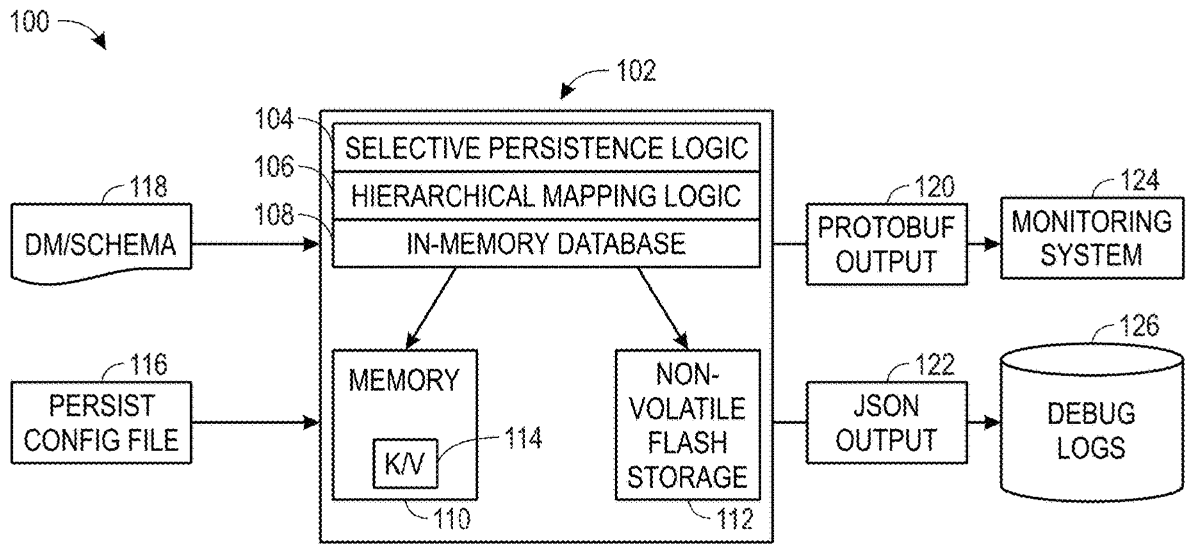
FIG. 1 is a diagram, illustrating an example of a system utilizing hierarchical mapping logic and selective persistence logic, in accordance with aspects of the present disclosure.

As mentioned above, an in-memory database (e.g., Redis (Remote Dictionary Server)) may be used in networking systems and/or computing systems. In certain cases, the in-memory database may be configured to include one or more native data types (e.g., lists, strings, hash tables) and support non-native data types (e.g., JSON (JavaScript Object Notation), protobuf (Protocol Buffer)) via modules. Data types may be stored as values for in-memory databases using a key-value pair model for storing and retrieving data. Moreover, an in-memory database may be configured to support persistence such that the integrity of the data stored thereon may be ensured. For example, a Redis database may perform a journaling operation wherein a record of each database operation (e.g., reading and writing) is stored in an append-only file. As such, the keys of the database may be secured in the event of an error. However, one may desire to only persist a certain subset of the data for efficiency purposes. As such, a portion of the techniques described herein are directed toward selective persistence methods. That is, selectively persisting only a subset of data (i.e., selectively persisting keys of a key-value database) may increase the overall efficiency of a system by effectively allocating resource usage thereby improving the performance of the system.

Additionally, modules of the in-memory database may support non-native data types by determining messaging formats, providing data type outputs, and/or encoding and decoding the non-native data types. However, these modules typically provide support for a single non-native data type and, thus, may not be able to satisfy multi-format demands of some dynamic applications. For example, an in-memory database module specifically for manipulating (i.e., reading, interpreting, outputting, inputting, etc.) data in a JSON format may not be able to encode and/or decode data in a protobuf format. The reverse may be true for a protobuf module of the in-memory database. As such, techniques for handling multiple format outputs via a uniform schema are provided herein.

Moreover, networking systems may require a specific format to satisfy network management protocols for one or more devices of the network. For example, in certain networking systems NETCONF (Network Configuration Protocol) may define the manner in which device configurations are installed, manipulated, and/or deleted. Accordingly, to define a internal and external data model for client communication with a server, a hierarchical data model (e.g., YANG (Yet Another Next Generation)) may be used within the networking system. That is, the hierarchical data model may exist on the client (e.g., management application) and the server (e.g., router), and may thereby facilitate communication in compliance with the network management protocols. In certain cases, network management protocols may require the hierarchical data model as a result of the protocol framework employed therein. For example, the NETCONF protocol framework includes one or more layers to facilitate communication between devices. Accordingly, the hierarchical data model may provide relationships necessary to establish such layers for NETCONF communication.

Accordingly, the techniques described herein are directed toward providing a scalable data type for a key-value in-memory database. The data type may support multiple data format options (e.g., JSON and protobuf) in a hierarchical format. As such, the data type may allow intuitive data management, more widespread consistency with available network/system management protocols (i.e., by providing the hierarchical data structure), and multiple format options (e.g., JSON and protobuf) for messaging and/or communication in networking systems. Moreover, for in-memory database network systems employing a subscribe-publish service, faster notifications based on data changes may be achieved as a result of using a key-value in-memory database.

With this in mind, FIG. 1 is a diagram illustrating a system 100 including a network component 102 employing selective persistence logic 104 and hierarchical mapping logic 106 in an in-memory database 108. As will be discussed in detail below, the selective persistence logic 104 is tasked with selectively persisting data of the in-memory database 108. The hierarchical mapping logic 106 is tasked with enabling hierarchical data structure support for non-hierarchical data of the in-memory database 108.

The network component 102 may be a device configured to operate under a specific networking management protocol (e.g., NETCONF or RESTCONF (Representational State Transfer Configuration)) in a particular network system. Accordingly, the network component 102 may be any suitable computing device capable of transmitting and receiving data from one or more other devices of the network system. To implement the selective persistence logic 104 and the hierarchical mapping logic 106, the network component may include a processor (i.e., processing circuitry) suitable for performing such logic operations. As such, the selective persistence logic 104 and the hierarchical mapping logic 106 may facilitate interactions between the in-memory database 108 and a memory 110 and a non-volatile flash storage 112.

Furthermore, the memory 110 may contain key-value pairs 114 stored within. Accordingly, the in-memory database 108 (e.g., in-memory data storage service) may store and transact upon the key-value pairs 114. For example, the in-memory database 108 may be configured to retrieve or write values of the key-value pairs 114 based on an entered database command. To aid in identification and retrieval, the key-value pairs 114 may include a keyspace containing keys associated with values stored within the memory 110. Accordingly, the keys may be any suitable identifier pointing to the logical location of the value within the memory. For example, a key may be a path, a string, an integer, etc. By the configuration enabled by the in-memory database 108 (e.g., in-memory data storage service), data may be accessed and acted upon (e.g., reading and writing) with greater efficiency as compared to other databases (such those operating on disks).

As mentioned above, the selective persistence logic 104 may include any logic necessary to implement selective persistence for certain keys of the keyspace. Accordingly, a persistence configuration file 116 may be used to determine which keys to persist and which keys to refrain from persisting. As discussed in detail below, the persistence configuration file 116 may contain any information (e.g., file, document, etc.) that may indicate which keys should be persisted and/or which keys should not be persisted. In implementing the persistence logic, the data within the memory 110 (e.g., the key-value pairs 114) may be mirrored into the non-volatile flash storage 112 by any suitable method (e.g., snapshotting, journaling, etc.).

The in-memory database 108 (e.g., in-memory data storage service) may support certain commands for acting upon the key-value pairs 114 (e.g., database commands such as GET or SET) and/or a subscribe-publish messaging model for the key-value pairs 114. The in-memory database 108 may be configured to export data in different formats according to the hierarchical mapping logic 106. To do so, the hierarchical mapping logic 106 may include using a data model/schema 118 provided to the network component 102. In certain embodiments, the data model/schema 118 may be a YANG data model, as discussed in detail below. The hierarchical mapping logic 106 may be configured to organize the storage, access, and/or manipulate data within the in-memory database 108 (e.g., the key-value pairs 114) in accordance with a mapping between a hierarchy defined in the data model/schema 118 and particular portions of the data within the in-memory databased 108, as provided by the data model/schema 118. Thus, the hierarchal mapping logic 106 enables interactions with the data of the in-memory database (e.g., the key-value pairs 114) in a hierarchical format. For example, a command may be issued to GET a certain node of a hierarchy. As such, the data model/schema may be configured to interact with the in-memory database 108 to achieve the command based upon a mapping to a particular key-value pair associated with the node of the hierarchy that is indicated in the data model/schema 118.

In addition to the commands discussed above, the data model/schema 118 may support different output formats for query outputs of the in-memory database 108. In the illustrated embodiment, the network component 102 outputs a protobuf output 120 and a JSON output 122 to a monitoring system 124 and a debug log database 126 respectively. The protobuf output 120 may contain serialized data retrieved from the in-memory database 108 thereby supporting network monitoring functions of the monitoring system 124. Moreover, the JSON output 122 may comprise data dumps of the data retrieved from the in-memory database 108, further including human-readable portions for the debug log database 126. Both output formats (the protobuf output 120 and the JSON output 122) may output as a tree-like hierarchical structure as facilitated by the data model/schema 118. Accordingly, each output format may be transmitted within the specified network management protocol of the network component 102.

As previously mentioned, the in-memory database 108 may support a subscribe-publish model of messaging. That is, data may be published to the in-memory database 108 via channels, and clients (e.g., receivers) may be configured to subscribe to channels such that messages published to the channels are received by the clients. Accordingly, the outputs (the protobuf output 120 and the JSON output 122) may be provided to certain channels based on a client device subscription. For example, the network monitoring system 124 may be configured to receive messages via a subscription to a certain channel providing notifications in the event that the data has been altered (e.g., onchange). As another example, the debug logs 126 may be configured to receive messages via a subscription to a certain channel providing notifications periodically (e.g., by a pre-defined and/or user-specified timer period). As such, the network component 102 may support defining output formats for certain messaging requirements.

Figure 2A:
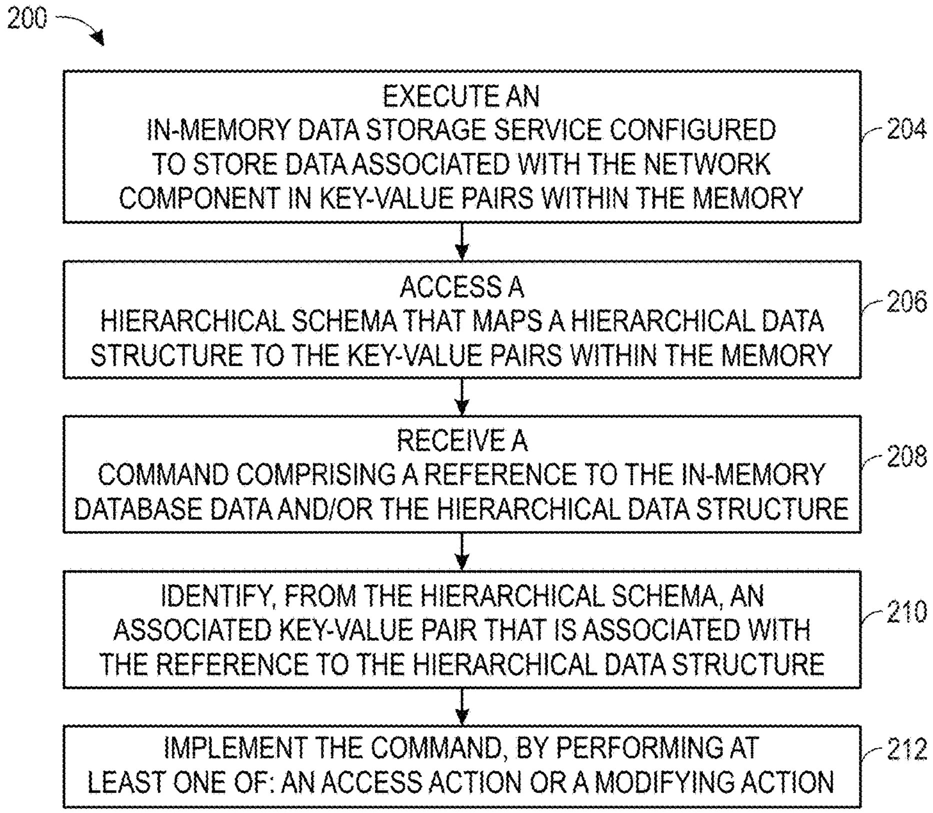
FIGS. 2A and 2B are flowcharts, each illustrating a process for implementing a command on an identified key-value pair of the in-memory data storage service using hierarchical mapping logic, in accordance with aspects of the present disclosure.
Figure 2B:
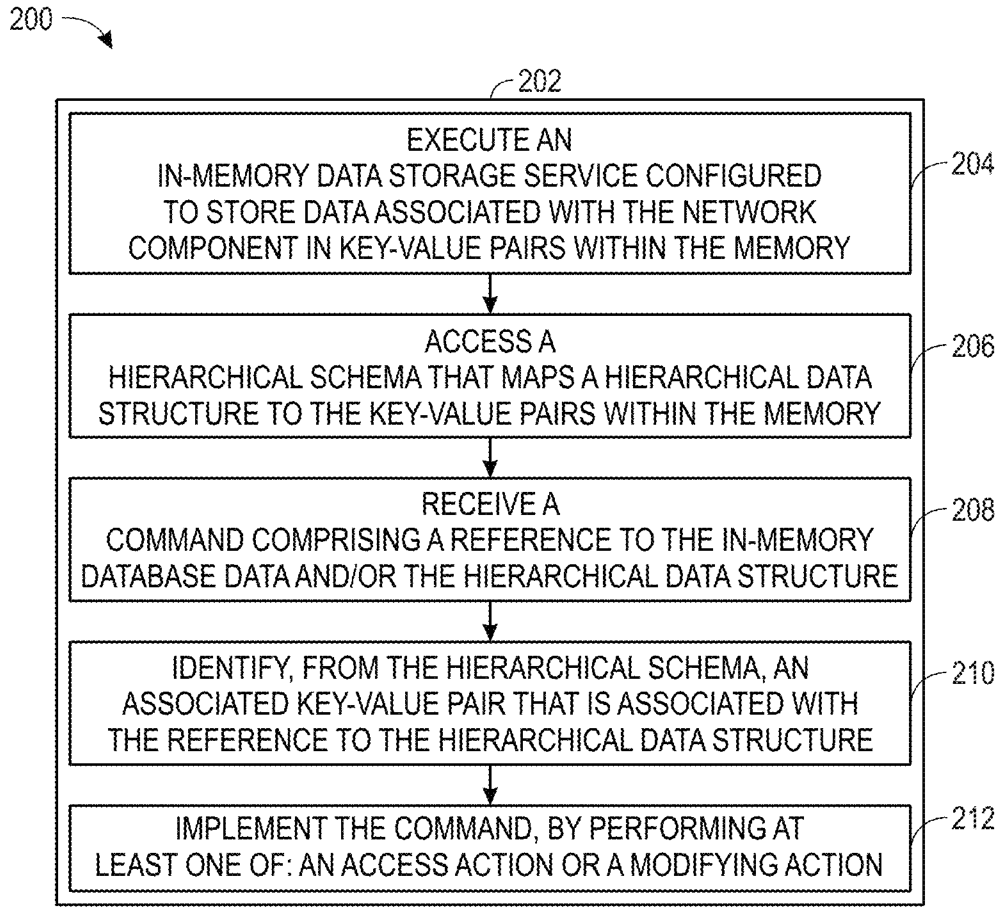

FIGS. 2A and 2B are flowcharts, each illustrating a process 200 for implementing a database command on an identified key-value pair of the in-memory data storage service using hierarchical mapping logic, such as hierarchical mapping logic 106 of FIG. 1, in accordance with the present disclosure. In certain embodiments, the process 200 may be instructions executed by a computer-readable medium. As such, FIG. 2B illustrates the process 200 as instructions stored on a memory 202 that may be executed by a processor. As previously mentioned, hierarchical mapping logic may be applied to a in-memory database of a networking component in order to obtain desired data format outputs (e.g., tree-like data structures, JSON, protobuf, etc.) and/or organize the data into such a format for storage and retrieval purposes. In this manner, telemetry models requiring hierarchical structures (e.g., tree-like structures) to define communication between a central device and one or more remote devices may be implemented such that messaging formats (e.g., protobuf) and human-readable formats (e.g., JSON) may be achieved while using a in-memory database. As such, the process 200 may allow a client to interact with the hierarchical mapping logic applied to a central device in the aforementioned manner, by allowing certain in-memory database transactions to occur using a hierarchical structure. For example, a desired database transaction may be the ability to GET and SET data, specifying particular nodes of a hierarchical data structure. Accordingly, the process 200 includes blocks for executing such commands.

The process 200 begins by executing an in-memory data storage service configured to store data associated with the network component in key-value pairs in the memory at block 204. Accordingly, by executing the in-memory data storage service (e.g., in-memory database), the key-value pairs held within the storage service may be accessible and/or initiated. As previously mentioned, the in-memory database service may be any suitable in-memory database service capable of storing and retrieving data via key-value pairs from a memory (e.g., Redis).

As may be appreciated, the key-value pairs may not be stored in a hierarchical data structure. Accordingly, such a hierarchical data structure may be associated with the key-value pairs. To do this, the process 200 may proceed to access a hierarchical schema (e.g., hierarchical data modelling schema, hierarchical data model) that maps a hierarchical data structure to the key-value pairs within the memory at block 206. The hierarchical data structure may be any suitable hierarchical model (e.g., YANG) capable of organizing the data in a tree-like and/or parent-child structure. Relationships between the data within the in-memory data storage service may be interacted with via the hierarchical data structure. The hierarchical schema may be loaded from an external source (e.g., hosted on an external server) and applied as a logical mapping structure to the in-memory database. For example, the hierarchical schema may be traversed node-to-node to identify an indication of particular keys associated with particular nodes of the hierarchical schema. These associations may be stored in a datastore, such as a memory and/or lookup table (LUT), enabling lookup of a particular key of the in-memory database that corresponds with an indicated hierarchical schema node.

At block 208, the process 200 may proceed to receive a command including a reference to the in-memory database data and/or the hierarchical data structure. In certain embodiments, the reference may be a channel of the in-memory data storage structure (e.g., a link in which messaging associated with referenced data is transferred), an addressing element (e.g., a key, XPath (XML Path Language), etc.), or any suitable reference providing an indication of a component of the hierarchical data structure having a relationship with corresponding data of the in-memory data storage service. The above-referenced addressing elements may be characteristic of the in-memory data storage service (e.g., a key) and/or the hierarchical data structure (e.g., XPath) As mentioned above, the command may be any command suitable for accessing and/or manipulating data via the database such as a GET command and SET command etc. As such, the command may interact with the database in a manner that is constrained by the hierarchical mapping structure implemented at block 206.

At block 210, an associated key-value pair may be identified based on the reference specified at block 208. For example, a command may contain a reference to a particular channel of the in-memory database and an addressing element (e.g., a key, XPath). As such, based on the specified references, the hierarchical data structure may allow a certain key-value pair to be identified within the in-memory data storage service. When the reference is to a component of the hierarchical data structure, the key-value pair may be identified via searching the hierarchical schema accessed at block 206 and/or via a lookup of the datastore generated based upon access of the hierarchical schema at block 206.

At block 212, the identified associated key-value pair may be accessed, modified, or both, based on the command issued at block 208. For example, a key-value pair may be identified by an associated channel and/or path. The command may correspond to a GET command, thereby returning the associated key-value pair. As such, the above process 200 may allow a client to implement a number of commands to interact with the in-memory data storage service via the hierarchical data structure. For example, the hierarchical data structure may correspond to a tree-like structure having parent nodes and layers of child nodes. Accordingly, the above process 200 may allow a client to access and/or modify the data by specifying references associated with a position in the hierarchy of the hierarchical data structure.

In certain embodiments, the process 200 may be used to access and/or manipulate the hierarchical data structure. For example, a client may issue a GET command to return the schema of the hierarchical data structure by specifying a specific channel and addressing element. Accordingly, commands allowing the hierarchical data structure to be accessed at the schema level may allow a client to ascertain the mapping of the hierarchical data structure to the in-memory data storage service, as discussed in detail below.

Figure 3:
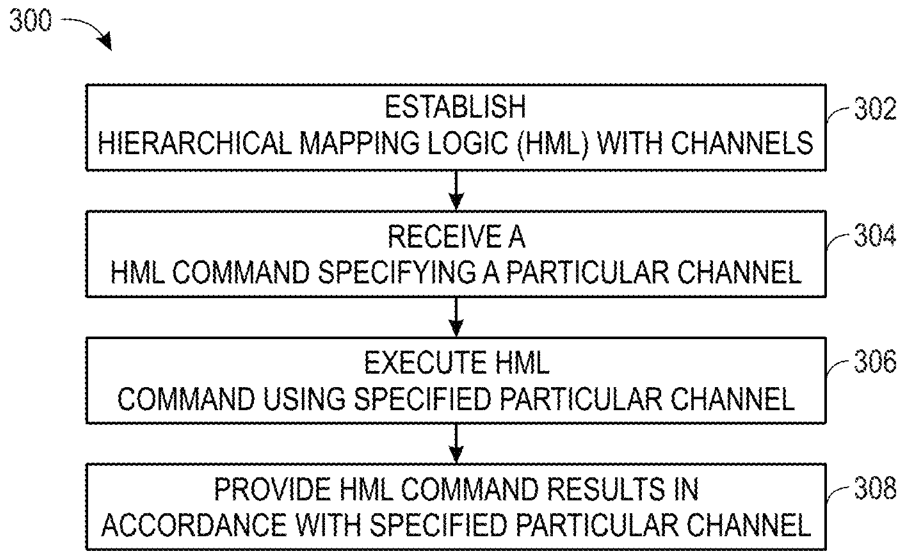
FIG. 3 is a flowchart, illustrating a process for establishing and utilizing hierarchical mapping logic with channels of the in-memory database, in accordance with aspects of the present disclosure.

FIG. 3 is a flowchart, illustrating a process 300 for executing commands and providing results based on channels of the in-memory database using the hierarchical mapping logic (HML). As previously mentioned, a channel may support publish/subscribe messaging by providing a communication pathway/link between clients and servers. For example, a sender may publish a message to a channel and a subscriber (e.g., receiver) may access/receive the message via the channel. Using the process 300 in certain networking configurations may allow one or more client devices to monitor specific information associated with a central computer. For example, a client device may be configured to monitor radio information published by a central computer to a channel. As such, the process 300 may allow the client device to retrieve (e.g., GET) the information in a certain format (e.g., JSON, protobuf) for further use. Accordingly, the process 300 provides a method for executing commands using the HML and specified channels of the in-memory database via a network component and an associated client device.

The process 300 begins at block 302 where the HML is established with channels. As previously mentioned, this may entail using a hierarchical schema to map a hierarchical data structure to an non-hierarchical data (e.g., the key-value pairs) in the in-memory database thereby allowing interaction with the data of the in-memory database at a hierarchical level. Further, channels for publishing data and/or subscribing to data in a particular format may be established. For example, the following table illustrates an example of a channel definition space that may be employed to provide specific options to access the mapping of the hierarchical data structure 404 to the in-memory database 402 by the data model/schema 406:

TABLE 1

Channel Definitions for Hierarchical Mapping Logic

| Subscribe type | Subscribe path type | Output data format | Channel space |
|---|---|---|---|
| Periodic | Redis key | protobuf | ___yangspace@0___ |
| Periodic | Redis key | json | ___yangspace@1___ |
| Periodic | xpath | protobuf | ___yangspace@2___ |
| Periodic | xpath | json | ___yangspace@3___ |
| onchange | Redis key | protobuf | ___yangspace@4___ |
| onchange | Redis key | json | ___yangspace@5___ |
| onchange | xpath | protobuf | ___yangspace@6___ |
| onchange | xpath | json | ___yangspace@7___ |

As illustrated above, the channel definition space may contain information pertinent to interacting with the in-memory database using the hierarchical data structure by certain references. The channel definition space may define a number of channels by providing channel space names, the output data format, the accessing element for subscriptions, and the type of subscription supported by the channel. In certain embodiments, the output data format may be a protobuf format or a JSON format. Moreover, the accessing element for a subscription may be a key (e.g., a Redis key for Redis databases) or a xPath reference. As such, data published to the subscription channel may be accessed via the specified accessing element. Additionally, the type of subscription supported by the channel may be a periodic subscribe type or an onchange subscribe type. In periodic subscriptions, the channel may be configured to notify any receivers of messaging within a specified period of time. In onchange subscriptions, the channel may be configured to notify any receivers of messaging upon receiving new/different messages to the channel. In view of the foregoing, it should be noted that the channel definition space may include any definitions capable of facilitating interactions with the in-memory database.

Commands accessing data via channels may retrieve and store data based on the definition set forth in the channel definition space. That is, the channels may be configured to only output a certain data format. For example, the channel "_yangspace@0_" may be configured to retrieve (e.g., GET) data in a protobuf format. The channels may be configured to allow a subscriber (e.g., client) to access the data based on the frequency and path set forth in channel definition space. For example, a client subscribed to "__yanspace@7_" may receive notifications in a JSON format by accessing the published message via xPath and only when the published message is changed from one state to another (e.g., onchange). As such, the channel definition space may facilitate interactions between a client and a server (e.g., hosting the in-memory database thereon) by providing definitions to execute such interactions.

Once the HML is established, the process 300 moves to block 304 where a HML command may be received at the network component specifying a particular channel. In certain embodiments, the command may also contain an addressing element pointing to a specific location in the in-memory data storage service and/or the hierarchical data structure, such as a key and/or path (e.g., XPath). For example, the command may be a SET command specifying a particular channel, a particular XPath as the addressing element, and a value to be written into a logical location of the in-memory database.

At block 306, the HML command may be executed using the particular channel specified within the command. In the previous example, having a SET command executed using the HML with a specified channel and path, may prompt the in-memory database to write a specified data value based on the channel and the addressing element. Although one example of an HML command acting on the data level is provided herein, it should be understood that HML commands may also be provided at the schema level and messaging level as described in detail above. The commands may be executed in accordance with the particular specified channel. For example, with respect to Table 1, above, yangspace@0-yangspace@3 may use a periodic subscribe type for commands and yangspace@4-yangspace@7 may use an onchange subscribe type for commands. Further, yangspace@0, yangspace@1, yangspace@4, and yangspace@5 may filter a command's data based upon a Redis key, while yangspace@2, yangspace@3, yangspace@6, and yangspace@7 may filter a command's data based upon an xPath filter.

At block 308, HML command results are provided to the commander in accordance with the specified channel. For example, results of the executed HML command are obtained from the in-memory database and provided in a format specified by the particular channel. That is, data obtained via a channel may be converted to a particular data format based on the expected output set forth in the channel definitions. For example, with respect to Table 1, above, yangspace@0, yangspace@2, yangspace@4, and yangspace@6 each return the obtained data in a protobuf format, while yangspace@1, yangspace@3, yangspace@5, and yangspace@7 return the obtained data in a JSON format. As such, the data contained within the in-memory database may be obtained in different formats (e.g., JSON or protobuf) based on the channel provided within the HML command and the corresponding channel definition.

Figure 4:
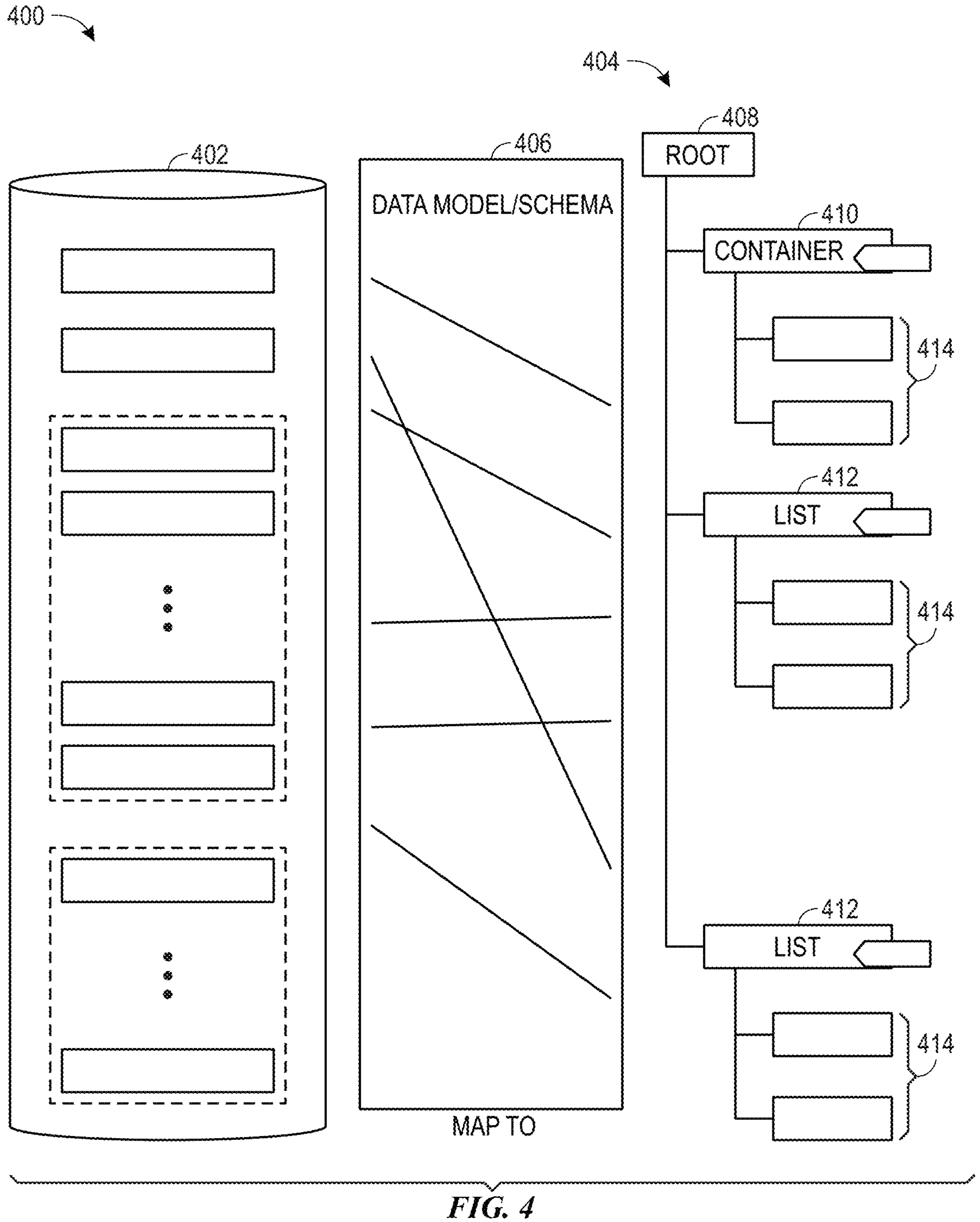
FIG. 4 is a diagram, illustrating the mapping of an in-memory database to a hierarchical structure using a data model/schema, in accordance with aspects of the present disclosure.

FIG. 4 is a diagram, illustrating an example system 400 having in-memory database (e.g., in-memory data storage service, in-memory database) and hierarchical data structure. In particular, the illustrated example shows how the in-memory database (e.g., Redis database) may be mapped to the hierarchical data structure via a particular data model/schema. As previously mentioned, the hierarchical data structure may allow interactions with the in-memory database by the data model/schema (e.g., via commands). Accordingly, the system 400 may represent a fully executed mapping of the in-memory database 402 to the hierarchical data structure 404 by the data model/schema 406.

As illustrated, mapping the key-value pairs of the in-memory database 402 may include defining the hierarchical data structure 404. In the illustrated embodiment, the hierarchical data structure 404 includes a root (parent) node 408, a container node 410, LIST nodes 412, and leaf nodes 414. In accordance with the present disclosure, a brief description of each type of node is included herein: a root node 408 may be a type of container node containing the top-level data defining the hierarchical structure. For example, the root node may define any child container nodes 410, list nodes 412, and/or leaf nodes 414, to be include within the hierarchical/tree-like structure. A container node 410 may be employed to group related nodes into a sub-hierarchy. For example, a container node 410 may be used to group leaf nodes (e.g., child nodes) related to a certain network state. List nodes 412 may be used to sequence any encompassed child nodes. Leaf nodes 414 (e.g., child nodes) may be used to store data such as the data types discussed above with respect to the in-memory database. It should be understood, however, that any suitable data model/schema may be used to define the hierarchical data structure 404. As such, any type(s) of nodes capable of defining hierarchical relationships may be included in the hierarchical data structure 404.

In order use the hierarchical data structure 404 with the in-memory database 402, the data model/schema 406 may be used to map the hierarchical data structure 404 to the key-value pairs stored in the in-memory database 402. As such, the data model/schema 406 may be any suitable data model/schema that, when applied within the system 400, is able to define and map the nodes of the hierarchical data structure 404 to the in-memory database 402. In certain embodiments, the data model/schema may be a YANG data modelling schema. As discussed previously, the data model/schema 406 may be any suitable document and/or file capable of interfacing the in-memory database 402 and the hierarchical data structure 404. For example, the data model/schema 406 contain a table defining the relationships between the expected key-value pairs of the in-memory database 402 and the hierarchical data model 404.

As discussed above, the system 400 may be employed to support messaging configurations within a network system. For example, the system 400 may be used to organize state data for a computing device, which may require the use of nested data to determine the states of top-level nodes. As such, a hierarchical data structure 404 may reference channels of the in-memory database 402 to subscribe to the state data published therein, thereby allowing the state data to be accessed at multiple hierarchy levels within the hierarchical data structure 404. Accordingly, to configure the system 400 to interact via a subscribe-publish model, the data model/schema 406 may establish channels, such as those described in Table 1, above. The channel definition space may provide specific options to access data of the in-memory database 402 via the mapping of the hierarchical data structure 404 to the in-memory database 402. As mentioned above, the channel definition space may contain information pertinent to interacting with the in-memory database 402 using the hierarchical data structure 404 by certain references. The channel definition space may define a number of channels by providing names, the output data format, the accessing element for subscriptions, and the type of subscription supported by the channel. In certain embodiments, the output data format may be a protobuf format or a JSON format. Moreover, the accessing element for a subscription may be a key (e.g., a Redis key for Redis databases) or a xPath reference. As such, data published to the subscription channel may be accessed via the specified accessing element. Additionally, the type of subscription supported by the channel may be a periodic subscribe type or an onchange subscribe type. In periodic subscriptions, the channel may be configured to notify any receivers of messaging within a specified period of time. In onchange subscriptions, the channel may be configured to notify any receivers of messaging upon receiving new/different messages to the channel. In view of the foregoing, it should be noted that the channel definition space may include any definitions capable of facilitating interactions of the system 400.

Commands accessing data via channels may retrieve and store data based on the definition set forth in the channel definition space. That is, the channels may be configured to only output a certain data format. For example, the channel "_yangspace@0_" may be configured to retrieve (e.g., GET) data in a protobuf format. In certain embodiments where the system 400 is used for messaging applications, the channels may be configured to allow a subscriber (e.g., client) to access the data based on the frequency and path set forth in channel definition space. For example, a client subscribed to "_yanspace@7_" may receive notifications in a JSON format by accessing the published message via xPath and only when the published message is changed from one state to another (e.g., onchange). As such, the channel definition space may facilitate interactions between a client and a server (e.g., hosting the in-memory database thereon) by providing definitions to execute such interactions.

Figure 5:
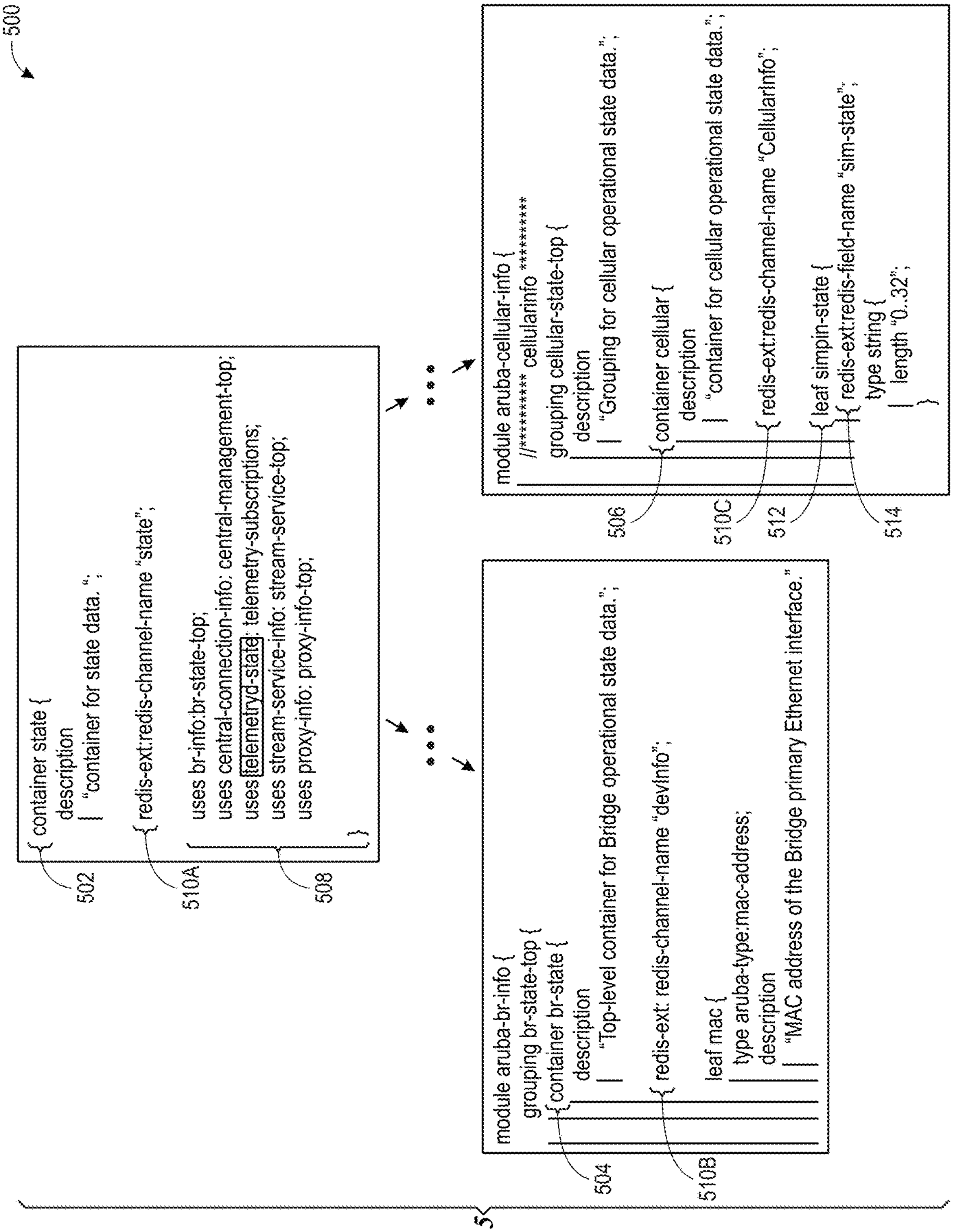
FIG. 5 is a diagram, illustrating examples of code implementations of the data model/schema, in accordance with aspects of the present disclosure.

FIG. 5 is a diagram illustrating an example of the implemented hierarchical structure with references to the in-memory database as outlined above. As previously mentioned, the hierarchical structure may be any hierarchy/data model capable of organizing data into tree-like structures and/or data models (e.g., accomplished via YANG data modelling language). Moreover, the system of the in-memory database and the hierarchical data structure may be used within networking configurations. Accordingly, the structure 500 and illustrates an example of an implemented structure in accordance with the techniques described herein.

TABLE 2

Example of Implemented Hierarchical Structure

| Container Type | Code |
|---|---|
| Parent | container state {<br>  description<br>    "container for state data.";<br>  redis-ext:redis-channel-name state";<br>  uses br-info:br-state-top;<br>  uses central-connection-info:central-management-top;<br>  uses telemetryd-state:telemetry-subscriptions;<br>  uses stream-service-info:stream-service-top;<br>  uses proxy-info:proxy-info-top;<br>} |
| Child | module aruba-br-info {<br>  grouping br-state-top {<br>    description<br>      "Top-level container for Bridge operational state data.";<br>    redis-ext:redis-channel-name "devInfo";<br>    leaf mac {<br>      type aruba-type:mac-address;<br>      description<br>        "MAC address of the Bridge primary Ethernet interface.";<br>    }<br>  }<br>} |
| Child | module aruba-cellular-info {<br>  // ********* cellularinfo *******<br>  grouping cellular-state-top {<br>    description "Grouping for cellular operational state data.";<br>  container cellular {<br>    description<br>      "container for cellular operational state data.";<br>    redis-ext:redis-channel-name "CellularInfo";<br>    leaf simpin-state {<br>      redis-ext:redis-field-name "sim-state";<br>      type string {<br>        length "0..32";<br>      }<br>      }<br>    }<br>  }<br>} |

The structure 500 contains a parent container 502 grouping state information, a first child container 504 containing a state of a bridge device, and a second child container 506 containing cellular data. The parent container 502 contains data related to one or more states of a network system. The states may be contingent on one or more other states of devices within the network, making a hierarchical data structure suitable to store and retrieve data having a parent-child relationship. Accordingly, the parent container 502 contains a group of child references 508 that may contain the aforementioned states of other devices within the network. The group of child references 508 may include a "uses" statement to define the relationships between the parent container 502 and certain groupings (e.g., children containers 504 and 506) of data. For example, the "state" parent container 502 contains a reference to a grouping of data "br-info" present within the first child container 504. References may implicitly include references to child containers (e.g., children of children) via inheritance. For example, the reference to the grouping of data "telemetryd-state" may contain references to a container "telemetryd-state" further having the second child container 506 "cellular-state-top". As such, the parent container 502 may be the aforementioned root node defining the top-level node of the tree structure.

In implementing the subscribe-publish model of the in-memory database, the parent container 502 may reference a channel (e.g., channels 510A, 510B, 510C). As previously mentioned, the channel (e.g., channels 510A, 510B, 510C) may define the specific communication path between the hierarchical data structure and the in-memory database. That is, channels may allow a subscriber to monitor a certain hierarchical data structure and/or portion of the hierarchical data structure, which may correspond to data (e.g., key-value pairs)_of the in-memory database. As such, in the illustrated example, the parent container 502 "state" may communicate with the in-memory database via a channel 510A "state", of which the communication may be restricted by the definition set forth in a channel definition space (e.g., defining the frequency of notification and/or type of data format output). The aforementioned concept may be carried over to the child containers 504 and 506, wherein each grouping further references an in-memory database channel 510B and 510C respectively.

Child container 506 illustrates an example of a leaf node 512 in the hierarchical data structure. In the illustrated embodiment, the leaf node 512 contains a references defining the databased therein. For example, the leaf node 512 "simpin-state" may contain a string of a certain length. Moreover, the leaf node 512 may further contain a reference to the in-memory database. In the illustrated example, the leaf node 512 contains a reference to a field name 514 of the in-memory database. Accordingly, the leaf node may logically represent a node of data related to a field name "sim-state" accessible by a combination of the channel 510C and the field name reference 514.

Accordingly, the structure 500 may represent an example of a data model/schema mapping the hierarchical data structure to the in-memory database. That is, the data is logically organized by the hierarchical data structure of the data model/schema (e.g., the structure 500) and contains references to the in-memory database (e.g., channel names, field names, etc.). As such, the structure 500 may facilitate hierarchical access to in-memory database, enabling efficient monitoring activities such as system monitoring and/or network monitoring.

Figure 6:
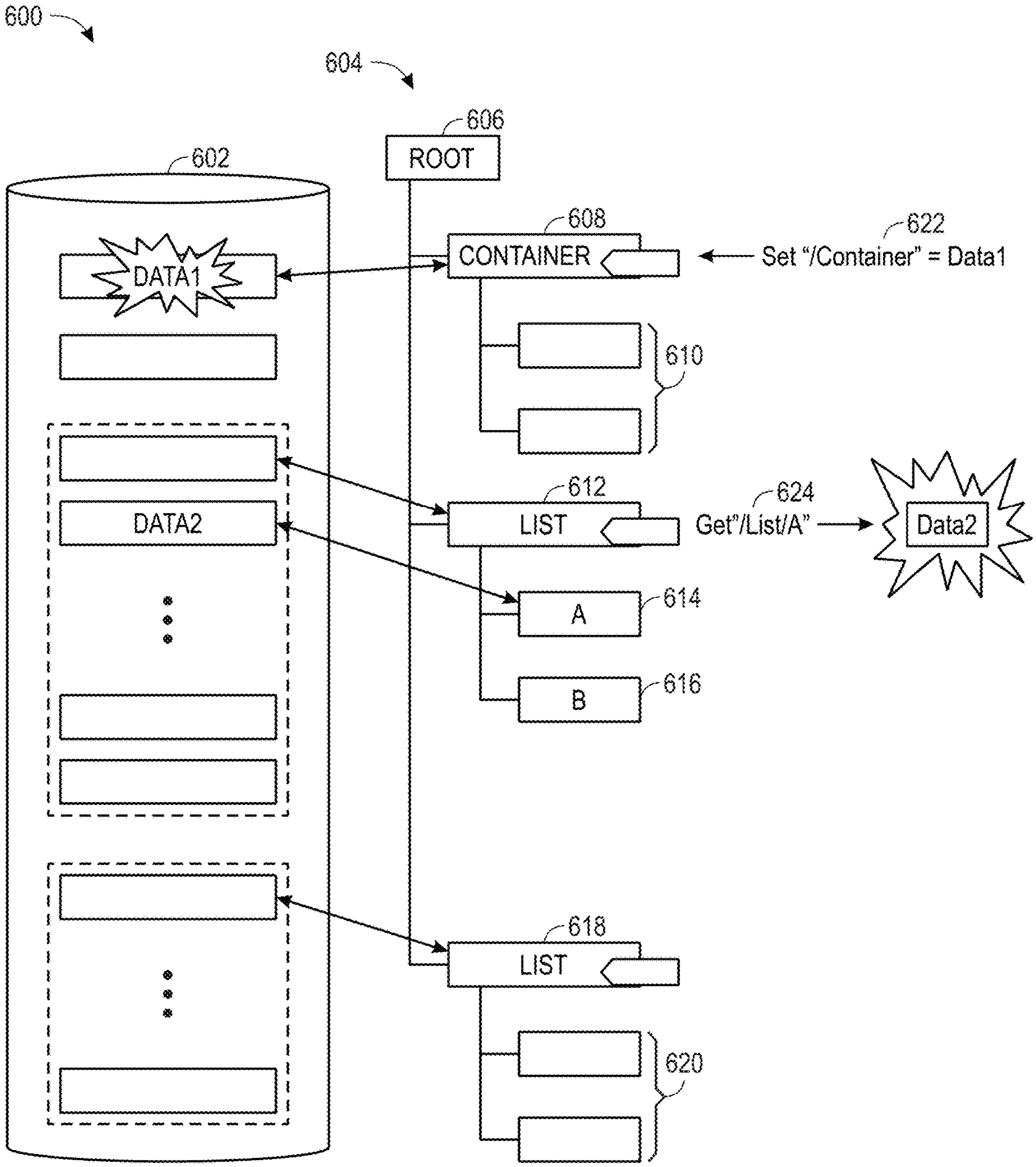
FIG. 6 is a diagram, illustrating examples of implementations of commands utilizing the hierarchical mapping logic, in accordance with aspects of the present disclosure.

FIG. 6 illustrates an example of a system 600 including an in-memory database 602 and a hierarchical data structure 604 capable of executing commands to retrieve, store, and/or manipulate data. As previously mentioned, one or more commands may be implemented using a hierarchical data structure, such as the hierarchical data structure 604 and an in-memory database, such as the in-memory database 602 to execute a number of database operations. For example, a GET command may be implemented to retrieve data from the database based on an associated reference (e.g., accessing element, channel, etc.). Accordingly, FIG. 6 is a diagram detailing the process of the hierarchical structure interfacing with the database to execute such commands.

The system 600 includes the in-memory database 602 and the hierarchical data structure 604. As previously mentioned with respect to FIG. 5, the hierarchical data structure 604 may include any hierarchical structure (e.g., a tree-like structure, a parent-child relationship defined by nodes, etc.). As illustrated, the hierarchical data structure 604 has a root node 606 in a parent relationship with a container node 608 having children 610, a list node 612 having a first child node 614 and a second child node 616, and a list node 618 having children 620.

The system 600 may be configured to support commands at the schema level, data level, and communication level. At the schema level, commands may be issued to act upon a specified portion of the hierarchy and/or schema. For example, a GET command specifying a schema level command and containing a reference to a certain channel may return the schema. As such, schema level commands that may be supported by the system 600 include load commands, unload commands, list commands, get commands, multiply get commands, and mapping commands. Accordingly, schema level commands may support hierarchical data manipulation/accessibility.

Data level commands may be issued to manipulate/access databased within nodes of the hierarchical structure. As such, to access data by data level commands, the system 600 may accept commands containing a reference to a channel, an accessing element, and/or a data value. For example, a SET command 622 may be issued to set the key-value pair data associated with container 608 equal to store data "Databa 1" by specifying, with the command 622, an accessing element (e.g., key, xPath, etc., here "/Container", indicating container 608 of the hierarchical data structure 604) and identifying the corresponding key-value pair within the database 602. As another example, a GET command 624 may be issued to retrieve the data of node 614 by containing an accessing element of the path pointing to a logical location (e.g., "List/A" of the hierarchical data structure 604) associated with data in the database 602, thereby returning the data "Data2" from the key-value pair of the database 602 that is associated with the accessing element. In certain embodiments, the list of supported data level commands for the system 600 may include set commands, get commands, and multiply get commands.

Communication level commands may be issued to specify client interactions with the database 602 via the hierarchical structure 604 in accordance with a subscribe-publish model of the database 602. In particular, a client may wish to interact with the database 602 by publishing data to channels and/or subscribing to channels to receive notifications of activity. As such, the system 600 may be configured to support a number of communication level commands such as subscribe commands, unsubscribe commands, psubscribe commands, punsubscribe commands, publish commands, and display subscription commands.

Figure 7:
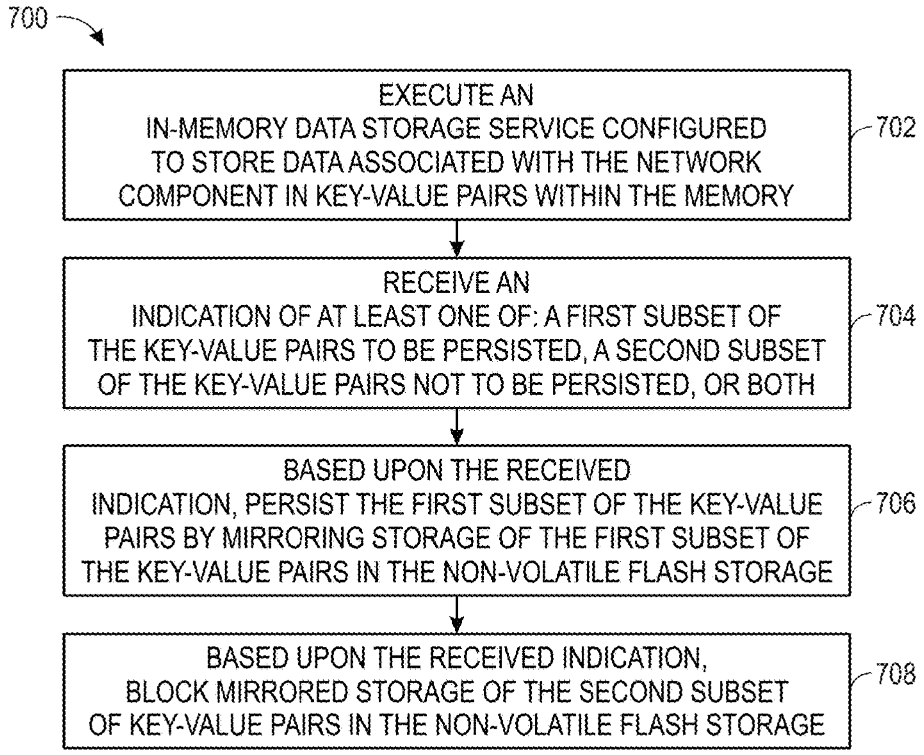
FIG. 7 is a flowchart, illustrating a process for selectively persisting key-value pairs of the in-memory database, in accordance with aspects of the present disclosure.

FIG. 7 is a flowchart detailing a process 700 for selectively persisting data within an in-memory database. As previously mentioned, traditional persistence methods for in-memory databases may not allow only a certain subset of data to be persisted. This may lead to inefficient use of persistent storage, by persisting storage of unnecessary data. As such, to optimize storage and performance of a system, selective persistence may be applied to only persist the most relevant data. In certain computing systems relevant data may include configuration information, provisioning rules, and certificate information. In other systems, data may be generated that may not require persistence. For example, in network device monitoring, data not needing persistence may include information such as client information, radio information, and monitoring information. As such, selective persistence may be applied to systems (e.g., networking, computing) to only commit data to be persisted (e.g., retained) to a non-volatile storage. For example, a computing system may selectively persist certificate information in order to retain such information across multiple restarts, while not persisting monitoring information as it is subject to continuous change. Accordingly, the process 700 includes processes for initiating and maintaining a system to selectively persist certain data. As such, it should be understood that selectively persisting data may occur within a key-value in-memory database such as the in-memory database of FIG. 1.

The process 700 begins at block 702, where an in-memory data storage service may be executed (e.g., initiated, set up, etc.). As previously discussed, the in-memory data storage may contain key-value pairs and a keyspace to manage interactions with the key-value pairs.

At block 704, the process 700 includes receiving an indication of a first subset of key-value pairs to be persisted, a second subset of key-value pairs to not be persisted, or both. In certain embodiments, the indications may be received as a configuration file. As previously mentioned, the in-memory data storage service may contain a keyspace defining all keys and logical locations of respective values. As such, the keys may be represented by any suitable accessing element (e.g., name field, path, etc.) In order to determine which keys should be persisted, a first indication may be received containing a first subset of keys to be persisted. The indication may be a list containing the accessing element of the keys. Moreover, a second indication may be received indicating a second subset of keys to not be persisted. Accordingly, due to the binary nature of selective persistence (e.g., is or not), it should be understood that only one indication may be required to implement the process 700. However, in certain embodiments, the process 700 may call for the keys to be fully defined in terms of persistence thereby requiring both indications.

At block 706, the process 700 may include mirroring the storage of the first subset of key-value pairs in a non-volatile flash store based on the indication received at block 704. As previously mentioned the in-memory data storage service may support persistence methods natively (e.g., for a REDIS database, persistence is supported via snapshotting or journaling). Accordingly, logic may be provided to the in-memory data storage service that may allow the key-value pairs to be selectively persisted by intercepting the command methods. For example, Table 3 displays pseudocode that may be used to intercept a SET command by checking if the specified key should be persisted:

TABLE 3

Intercepting Command Methods for Selective Persistence

| Command | Pseudocode |
|---|---|
| SET | #include "redismodule.h"<br>int MySetCommand_RedisModule_Set(RedisModuleCtx *ctx, RedisModuleString **argv, int argc) {<br>if (argc != 3) {<br>return RedisModule_WrongArity(ctx)<br>}<br>// Extract the key and value<br>RedisModuleString *key = argv[1];<br>RedisModuleString *value = argv[2];<br>// Custom logic (e.g., check if the key should be persisted)<br>if (/* check if key should be persisted */) {<br>// Handle custom persistence logic<br>}<br>// Call the original SET command<br>RedisModule_Call(ctx, "SET", "ss", key, value);<br>return REDISMODULE_OK;<br>} |

In the above example, the SET command of the in-memory database may be altered by defining custom handlers (e.g., the pseudocode) to intercept it. As shown, the custom handler may extract a key from an entered command, and determine if the key should be persisted (e.g., by checking if the key is noted in the configuration file such as the configuration file received at block 704). If the key is to be persisted, the custom handler may implement persistence logic that persists the key (e.g., using persistence functions of the in-memory database) and then call the original SET command. Otherwise, if the key should not be persisted, the original SET command may be implemented without undergoing the persistence logic. Accordingly, it should be understood that the above custom handlers may be defined to intercept any number of commands of the in-memory database in implementing the selective persistence methods described herein.

Upon determining that a key should be persisted, the key-value pairs may be committed to the non-volatile flash storage by any suitable mirroring method as to not lose access to the data and/or continuously update the data. Further, this interception of the native persistence methods may include logic to refrain from persisting (e.g., snapshotting or journaling) the second set of key-value-pairs. Accordingly, at block 708, the process 700 may include blocking the mirrored storage (i.e., not persisting) of the second set of key-value pairs based on the indication. In certain embodiments, the keys that are not persisted may be dynamic data, continuously updating and therefore not requiring strict integrity.

Figure 8:
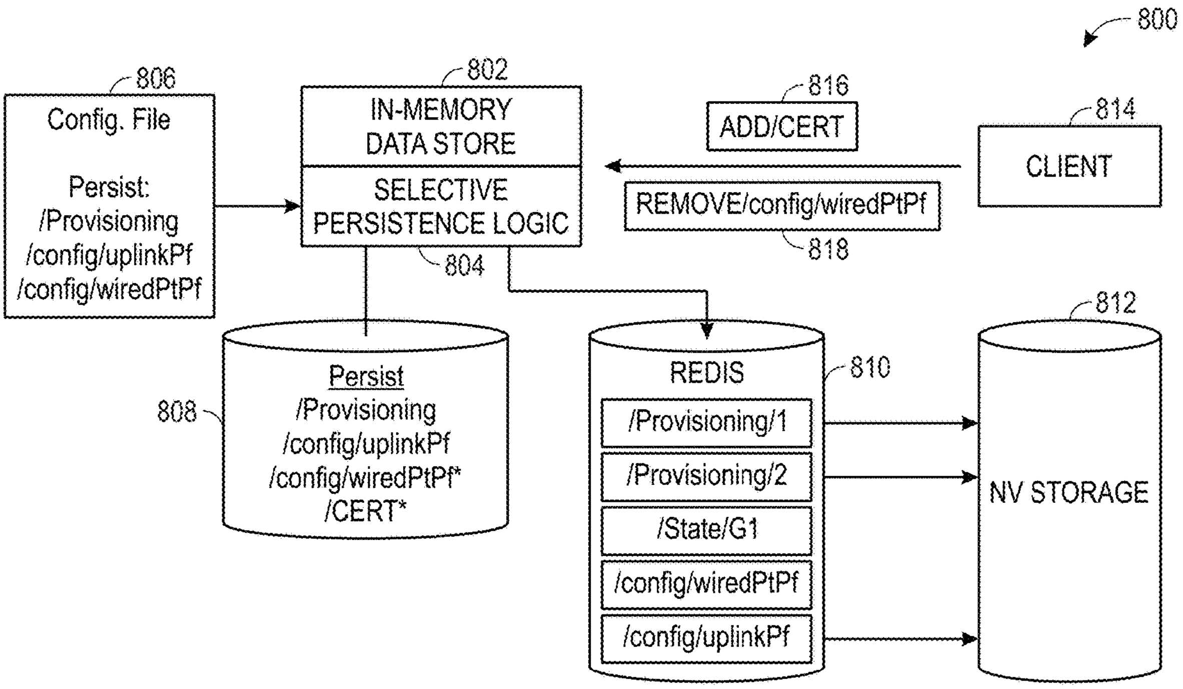
FIG. 8 is a diagram, illustrating an example of a system for implementing selective persistence logic of a in-memory database, in accordance with aspects of the present disclosure.

FIG. 8 is a diagram illustrating a system 800 for implementing selective persistence for an in-memory database. As mentioned above with respect to FIG. 7, selective persistence may provide the benefit of allowing only certain keys to be committed to a non-volatile memory to thereby allow further access to the data without needing to maintain dedicated records in the in-memory database. Accordingly, the system 800 displays the components of such a system that may be implemented in applications using such an in-memory database. With respect to FIG. 1, it should be understood that the system 800 may be implemented in conjunction with the hierarchical mapping logic described above.

The system 800 includes an in-memory data store 802 having applied selective persistence logic 804. As previously mentioned, the in-memory data store 802 may be any suitable key-value data store having databased within the memory of a computing device. The selective persistence logic 804 may be any documentation/files, containing the necessary logic to implement the selective persistence techniques described herein. Accordingly, it should be understood that the selective persistence logic 804 may intercept commands sent to the database (e.g., GET and SET commands) and apply appropriate logic based on the desired persistence output.

The in-memory data store 802 and the selective persistence logic 804 may include a configuration file 806 containing a subset of data to persist and/or a subset of data to not persist. In the illustrated embodiment, the configuration file 806 contains a list of data to persist. The configuration file 806 may support persistence for certain key prefixes and/or certain keys. For example, the prefix "/Provisioning" is listed in the configuration file 806, thereby indicating that all keys with the "/Provisioning" prefix should be persisted. As another example, the keys "/config/uplinkPf" and "/config/wiredPtPf" are indicated in the configuration file 806 as individual keys to be persisted.

Once the configuration file 806 is provided to the in-memory database 802 and the selective persistence logic 804, the key prefixes and/or certain keys may be committed to a database 808. As such, the database 808 may facilitate the storage of such indications. For example, in the illustrated embodiment, the list of key prefixes and/or keys to be persisted are retained within the database 808. As such, altering the persistence indications (e.g., by removing and/or adding) may include altering the database 808 so as to remain a real-time reference for persistence operations performed by the in-memory database 810 and the non-volatile storage 812.

To perform persistence operations, the keys may be mirrored from the in-memory database 810 to the non-volatile storage 812 by any suitable method (e.g., snapshotting, journaling, etc.). That is, the key-value pairs may exist in the non-volatile storage 812, which provides a copy of the key-value pairs. In the illustrated example, the database 810 mirrors the key-value pairs "/Provisioning/1", "/Provisioning/2", and "/config/uplinkPtPf", to the non-volatile storage 812 as the prefix "/Provisioning" and the key "/config/uplinkPtPf" are listed in the database 808.

A client 814 may interact with the system 800 to alter which keys should be selectively persisted from the in-memory database 810 to the non-volatile storage 812. The client may be any computing device capable of interacting with the computing device of the in-memory data store 802 as mentioned above. Accordingly, the selective persistence logic 804 may be configured to accept commands issued by the client 814. For example, the command 816 may allow a client device to add the key prefix "/CERT" to the configuration file 806 thereby adding a specific key prefix to persist. Accordingly, the prefix "/CERT" may be added to the database 808 to ensure that the database 810 may persist any keys with the prefix "/CERT" to the non-volatile storage 812. As another example, the command 818 may allow a client device to remove the key "/config/wiredPtPf" from the database 808, thereby preventing the persistence of the "/config/wired/PtPf" key from the in-memory database 810 to the non-volatile storage 812.

In addition to the commands discussed above, the selective persistence logic 804 may be configured to intercept commands characteristic of the database 810, as discussed above with respect to FIG. 7. For example, a client 814 may wish to use a SET command to set data within the in-memory database 810. As such, the selective persistence logic 804 may be configured to determine whether or not the data is to be persisted upon issuing the SET command by intercepting the native SET command of the in-memory database 810.

As may be appreciated, the current techniques provide significant value. For example, the current techniques provide a method for improved data management for network monitoring.

One or more specific aspects of the present disclosure will be described below. In an effort to provide a concise description of these aspects, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various aspects of the present disclosure, the articles "a," "an," "the," and "said" are intended to mean that there are one or more of the elements. The terms "comprising," "including," and "having" are intended to be inclusive and mean that there may be additional elements other than the listed elements.

While certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A network component, comprising:

a memory; and a processor, wherein the processor is configured to:

- execute an in-memory data storage service configured to store data associated with the network component in key-value pairs within the memory;
- access a hierarchical schema that maps a hierarchical data structure to the key-value pairs within the memory;
- receive a command comprising a reference to the hierarchical data structure;
- identify, based upon an indication in the command, a selection of a particular output data format of a plurality of supported output data formats;
- identify, from the hierarchical schema, an associated key-value pair that is associated with the reference to the hierarchical data structure; and
- implement the command in accordance with the particular output data format, by performing at least one of: an access action or a modifying action.

2. The network component of claim 1, wherein the hierarchical schema comprises a Yet Another Next Generation (YANG) data modelling schema that maps a YANG data structure to the key-value pairs within the memory.

3. The network component of claim 2, wherein the hierarchical schema comprises a Remote Dictionary Server (Redis) service that stores the key-value pairs in a non-hierarchical structure.

4. The network component of claim 2, wherein the reference to the hierarchical data structure comprises an XML Path Language (XPath) reference specifying a component of the YANG data structure; and the processor is configured to identify the associated key-value pair that is associated with the component t of the YANG data structure.

5. The network component of claim 2, wherein the processor is configured to:

generate a plurality of channel definitions, each channel definition specifying:

a subscription type comprising a periodic subscription or an onchange subscription; and a subscription path type comprising a selection of either a key reference of the in-memory data storage service or a hierarchical reference to the YANG data structure;

identify, from the command, a specified channel definition of the plurality of channel definitions; and implement the command with a corresponding subscription type and a corresponding subscription path type that corresponds to the specified channel definition.

6. The network component of claim 1, wherein the plurality of supported output data formats comprise a JavaScript Object Notation (JSON) data format and a Protocol Buffer (protobuf) data format.

7. The network component of claim 6, wherein the indication in the command comprises an indication of a selection of a channel definition that specifies one of the JSON data format or the protobuf data format.

8. The network component of claim 1, wherein:

the command comprises a GET command; and the processor is configured to return, in response to the GET command, a hierarchical output associated with the reference to the hierarchical data structure.

9. The network component of claim 1, wherein:

The command comprises a SET command; and the processor is configured to, in response to the SET command, write a specified value provided with the command to the associated key-value pair.

10. The network component of claim 1, comprising:

a non-volatile flash storage;

wherein:

the command comprises a command to selectively persist the associated key-value pair; and in-response to the command, the processor is configured to persist the key-value pair to the non-volatile flash storage.

11. A method, comprising:

executing, via a processor, an in-memory data storage service configured to store data associated with a network component in key-value pairs within a memory;

receiving, via the processor, a command comprising at least an indication of at least one of: a first subset of the key-value pairs to be persisted or a second subset of the key-value pairs to not be persisted;

based upon the received indication, perform at least one of:

persisting the first subset of the key-value pairs, via the processor, by mirroring storage of the first subset of the key-value pairs in a non-volatile flash storage; and block, via the processor, mirrored storage of the second subset of the key-value pairs in the non-volatile flash storage;

identifying, based upon the indication in the command, a selection of a particular output data format of a plurality of supported output data formats; and implementing the command in accordance with the particular output data format.

12. The method of claim 11, comprising loading, via the processor, a configuration file comprising the indication.

13. The method of claim 11, comprising:

receiving, via the processor, a command that specifies at least one of: a particular prefix or a particular key to:

add to the first subset of the key-value pairs or remove from the second subset of the key-value pairs; and in response to the command, persist the at least one of the particular prefix or the particular key.

14. The method of claim 11, comprising:

receiving a command that specifies a particular prefix, a particular key, or both to remove from the first subset of the key-value pairs, add to the second subset of the key-value pairs, or both; and in response to the command, block mirrored storage of the particular prefix, the particular key, or both.

15. A non-transitory computer readable medium, comprising computer-readable instructions, that when executed by one or more processors of one or more computers, cause the one or more computers to:

execute an in-memory data storage service configured to store data associated with a network component in key-value pairs within a memory;

access a hierarchical schema that maps a hierarchical data structure to the key-value pairs within the memory;

receive a command comprising a reference to the hierarchical data structure;

identify, based upon an indication in the command, a selection of a particular output data format of a plurality of supported output data formats;

identify, from the hierarchical schema, an associated key-value pair that is associated with the reference to the hierarchical data structure; and implement the command in accordance with the particular output data format, by implementing an action on the associated key-value pair, wherein the action comprises at least one of: an access action and a modifying action.

16. The non-transitory, computer readable medium of claim 15, wherein the hierarchical schema comprises a Yet Another Next Generation (YANG) data modelling schema that maps a YANG data structure to the key-value pairs within the memory.

17. The non-transitory, computer readable medium of claim 16, wherein the hierarchical schema comprises a Remote Dictionary Server (Redis) service that stores the key-value pairs in a non-hierarchical structure.

18. The non-transitory computer readable medium of claim 16, further comprising computer-readable instructions, that when executed by one or more processors of one or more computers, cause the one or more computers to:

generate a plurality of channel definitions, each channel definition specifying:

a subscription type comprising a periodic subscription or an onchange subscription; and a subscription path type comprising a selection of either a key reference of the in-memory data storage service or a hierarchical reference to the YANG data structure;

identify, from the command, a specified channel definition of the plurality of channel definitions; and implement the command with a corresponding subscription type and a corresponding subscription path type that corresponds to the specified channel definition.

19. The non-transitory computer readable medium of claim 15, further comprising computer-readable instructions, that when executed by one or more processors of one or more computers, cause the one or more computers to:

identify, based upon an indication in the command, a selection of a particular output data format of a plurality of supported output data formats; and implement the command in accordance with the particular output data format.

* * * * *